United States Patent
Huang et al.

(10) Patent No.: US 7,768,246 B2
(45) Date of Patent: Aug. 3, 2010

(54) OUTPUT RIPPLE CONTROL CIRCUIT AND METHOD FOR A PWM SYSTEM

(75) Inventors: Jian-Rong Huang, Hsinchu (TW);
Giovanni Capodivacca, Padua (IT);
Giuseppe Bernacchia, Padua (IT);
Kuo-Lung Tseng, Lungtan Township, Taoyuan County (TW)

(73) Assignee: Richtek Technology Corp., Hsinchu (TW)

( * ) Notice: Subject to any disclaimer, the term of this patent is extended or adjusted under 35 U.S.C. 154(b) by 694 days.

(21) Appl. No.: 11/493,554

(22) Filed: Jul. 27, 2006

(65) Prior Publication Data

US 2008/0024101 A1  Jan. 31, 2008

(51) Int. Cl.
*G05F 1/00* (2006.01)
(52) U.S. Cl. ..................................................... 323/282
(58) Field of Classification Search ......... 323/282–285, 323/222, 224, 227; 363/415
See application file for complete search history.

(56) References Cited

U.S. PATENT DOCUMENTS

| | | | |
|---|---|---|---|
| 6,979,985 B2* | 12/2005 | Yoshida et al. | 323/282 |
| 7,030,596 B1* | 4/2006 | Salerno et al. | 323/282 |
| 2005/0017767 A1* | 1/2005 | Huang et al. | 327/110 |
| 2005/0212498 A1* | 9/2005 | Kubota et al. | 323/282 |
| 2006/0055385 A1* | 3/2006 | Schiff | 323/282 |
| 2006/0164056 A1* | 7/2006 | Deguchi | 323/282 |

* cited by examiner

*Primary Examiner*—Bao Q Vu
*Assistant Examiner*—Jue Zhang
(74) *Attorney, Agent, or Firm*—Rosenberg, Klein & Lee

(57) ABSTRACT

An output ripple control circuit and method for a PWM system uses a hysteresis threshold to clamp the output ripple of the PWM system such that the output ripple will not vary with the dc level of the output voltage, and therefore the output ripple control may be combined into any main loop technologies.

3 Claims, 12 Drawing Sheets

OUTPUT RIPPLE CONTROL CIRCUIT AND METHOD FOR A PWM SYSTEM

FIELD OF THE INVENTION

The present invention is related generally to a pulse width modulation (PWM) system and, more particularly, to an output ripple control circuit and method for a PWM system.

BACKGROUND OF THE INVENTION

In a PWM system, conventionally, the output voltage ripple control usually uses hysteresis control, also called band-band control, to maintain the output voltage of the PWM system within a hysteretic band which is centered about the internal reference voltage. For further detail, FIG. 1 shows a typical PWM system 100 using the hysteresis ripple control, which comprises a control circuit 102 to switch a switching circuit 104 to produce an output voltage Vout. In the switching circuit 104, a high-side switch SW1 and a low-side switch SW2 are connected in series between an input voltage VIN and ground GND. The control circuit 102 provides a high-side switching signal HS and a low-side switching signal LS for a high-side driver 112 and a low-side driver 114 in the switching circuit 104, respectively, to produce a high-side driving signal UG and a low-side driving signal LG to respectively switch the switches SW1 and SW2, and an inductor current IL is thus produced to flow through an inductor L to charge a capacitor C so as to produce the output voltage Vout. In order to regulate the output voltage Vout, two serially connected resistors R1 and R2 are further provided in the switching circuit 104 to divide the output voltage Vout to thereby generate a feedback voltage FB for the control circuit 102, in which a first comparator 106 compares the feedback voltage FB with a valley voltage Vvalley to determine a first comparison signal PM, a second comparator 108 compares the feedback voltage FB with a peak voltage Vpeak to determine a second comparison signal Sc, and an SR flip-flop 110 has a set input S and a reset input R connected with the two comparison signals PM and Sc to thereby produce the two switching signals HS and LS, respectively.

FIG. 2 is a waveform diagram to exemplarily show various signals in the PWM system 100 of FIG. 1, in which waveform 116 represents the peak voltage Vpeak, waveform 118 represents the feedback voltage FB, waveform 120 represents the valley voltage Vvalley, waveform 122 represents the first comparison signal PM, waveform 124 represents the second comparison signal Sc, and waveform 126 represents the high-side driving signal UG. In the control circuit 102, once the feedback voltage FB decreases to a level not greater than the valley voltage Vvalley, as indicated at time t1 in FIG. 2 for example, the first comparator 106 sets the SR flip-flop 110 by the first comparison signal PM and accordingly, the high-side switching signal HS transits from low level to high level and the low-side switching signal LS transits from high level to low level. As a result, the high-side driving signal UG will be high level so as to turn on the high-side switch SW1 and the low-side driving signal LG will be low level so as to turn off the low-side switch SW2, by which the inductor current IL flows from the high-side switch SW1 to the capacitor C to thereby charge the capacitor C, and therefore the output voltage Vout increases. Since the feedback voltage FB is proportional to the output voltage Vout, it will raise as the output voltage Vout increases, and until the feedback voltage FB reaches the peak voltage Vpeak at time t2 as shown in FIG. 2, the second comparator 108 resets the SR flip-flop 110 by the second comparison signal Sc, such that the high-side switching signal HS transits from high level back to low level and the low-side switching signal LS transits from low level to high level. Accordingly, the high-side driving signal UG becomes low level to turn off the high-side switch SW1 and the low-side driving signal LG becomes high level to turn on the low-side switch SW2. Subsequently, the capacitor C is discharged and the output voltage Vout decreases. The feedback voltage FB then falls down in follow to the decreasing output voltage Vout until the next time it becomes not greater than the valley voltage Vvalley, the above operations will repeat again. The hysteresis control is so operated and, as shown in FIG. 2, the control circuit 102 will control the output ripple in a band range corresponding to that between the voltages Vvalley and Vpeak.

Even though the output voltage Vout may be corrected as quickly as the output filter allows and the output ripple is fixed, the conventional hysteresis PWM mode is difficult to be integrated into other topologies. For example, in Intel CPU Vcore applications, the output voltage has droop as the inductor current increases. If such system is to be integrated with the conventional hysteresis ripple control, the hysteretic band is required to be adjusted with the output load, i.e., the voltages Vvalley and Vpeak have to decrease when the PWM output loading increases, and vice versa, which is very difficult and unfeasible. Similarly, the conventional hysteresis mode is difficult to combine with low-gain current mode.

Therefore, it is desired a novel output ripple control circuit and method for a PWM system.

SUMMARY OF THE INVENTION

An object of the present invention is to provide an output ripple control circuit and method for a PWM system, by which the output voltage ripple of the PWM system is able to be fixed and not to vary with the level of the output voltage.

For a PWM system having a switching circuit to convert an input voltage to an output voltage, according to the present invention, an output ripple control circuit comprises a first sub-circuit having an error amplifier to produce a first signal by detecting the output voltage, a second sub-circuit having a voltage source to supply a voltage as a hysteresis threshold for shifting the first signal to be a second signal, and a third sub-circuit in response to the first and second signals to produce a third signal for driving the switching circuit.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAIL DESCRIPTION OF THE INVENTION

Figure 1:
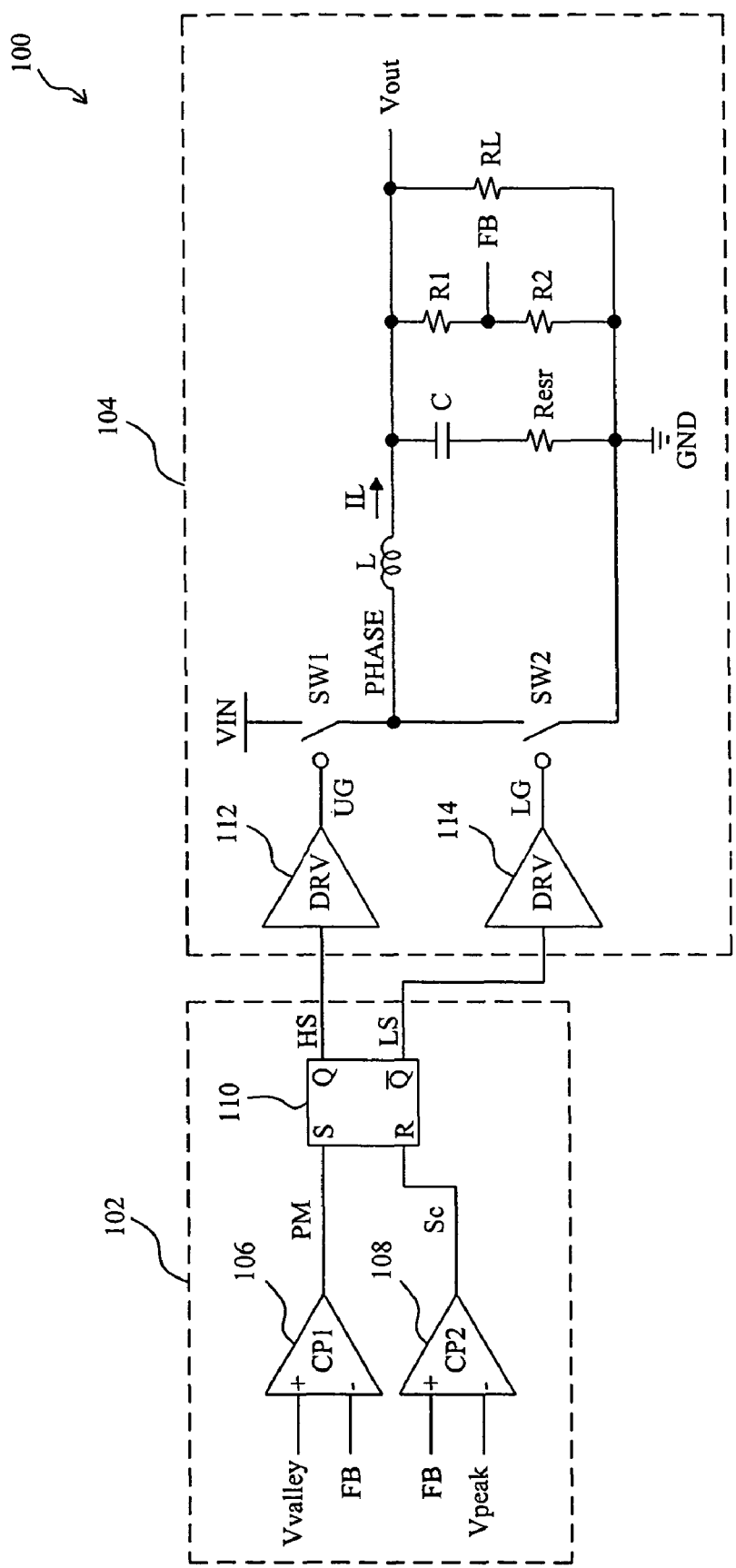
FIG. 1 shows a typical PWM system using a conventional hysteresis control.
Figure 2:
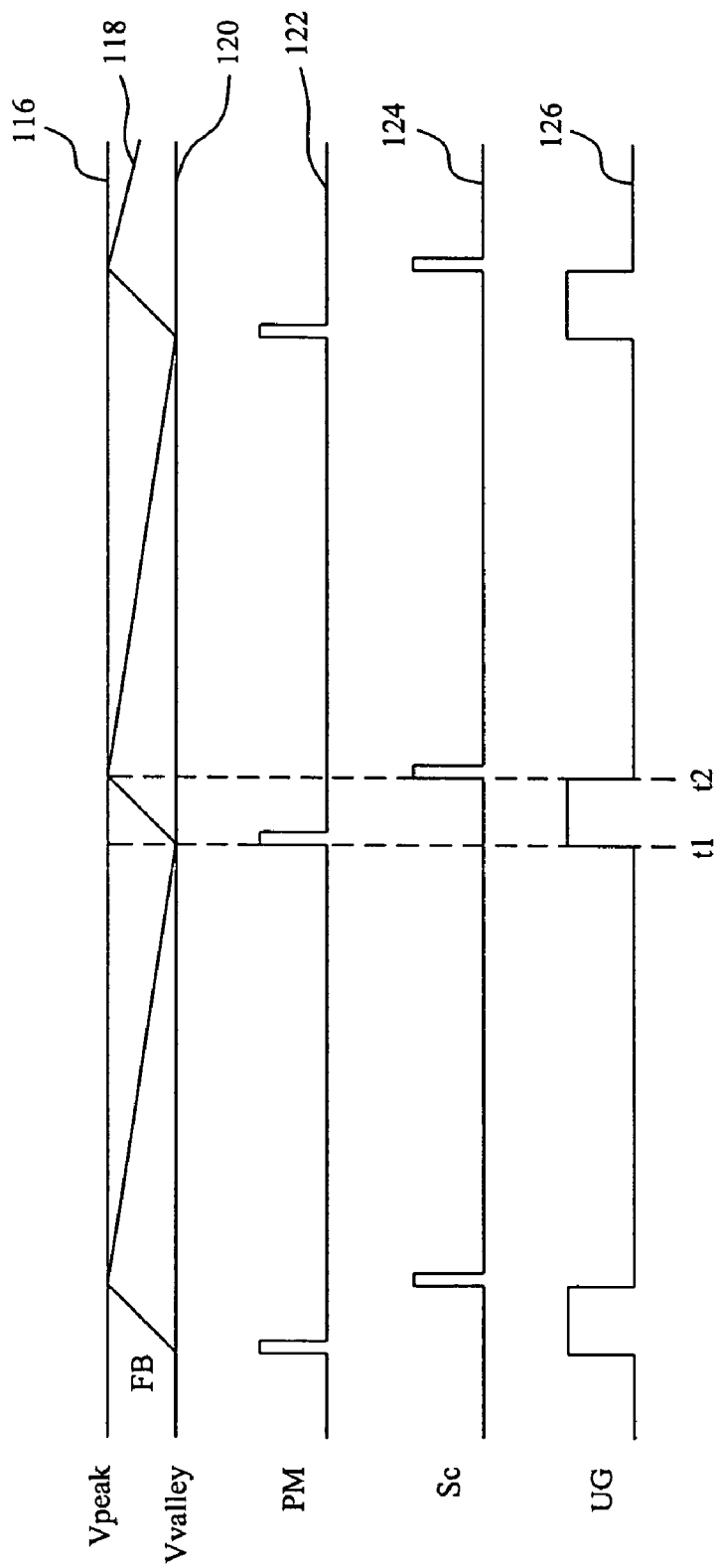
FIG. 2 is a waveform diagram to show various signals in the PWM system of FIG. 1.
Figure 3:
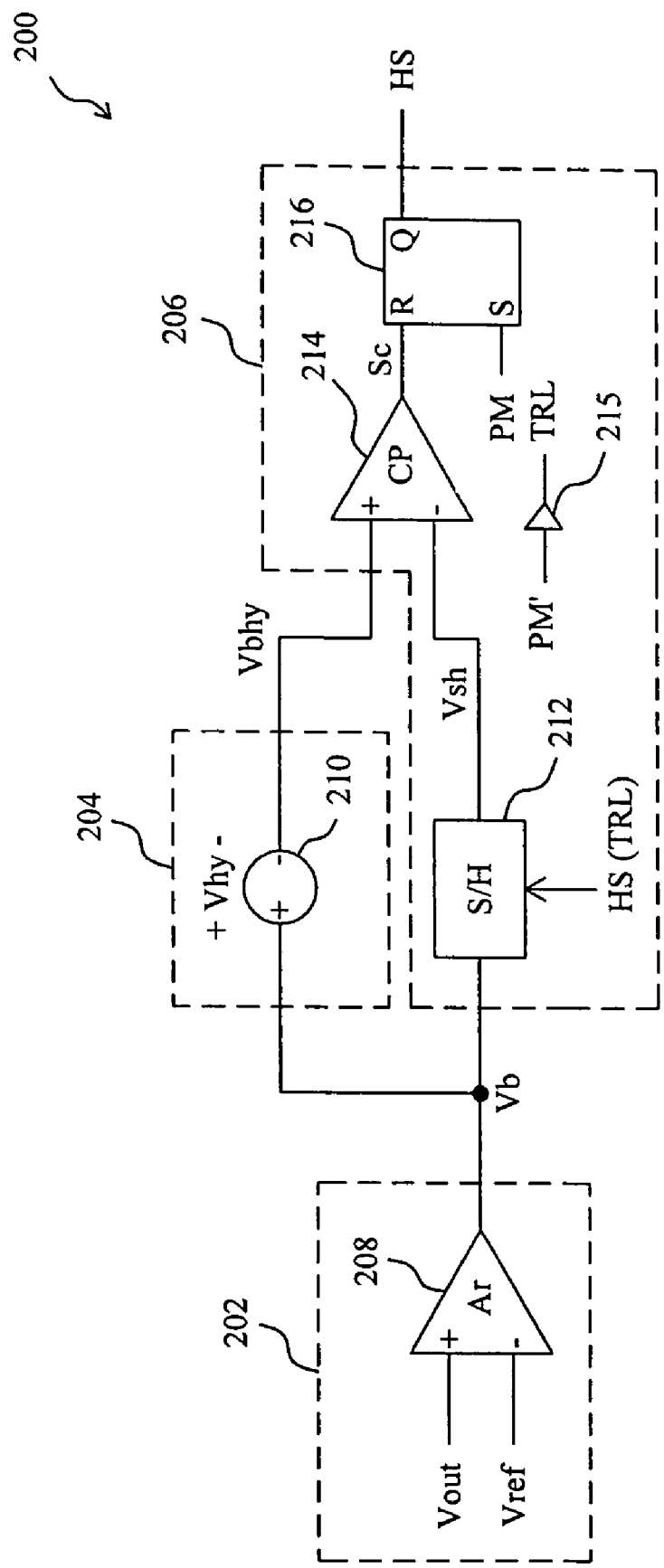
FIG. 3 shows a control circuit according to the present invention.
Figure 4:
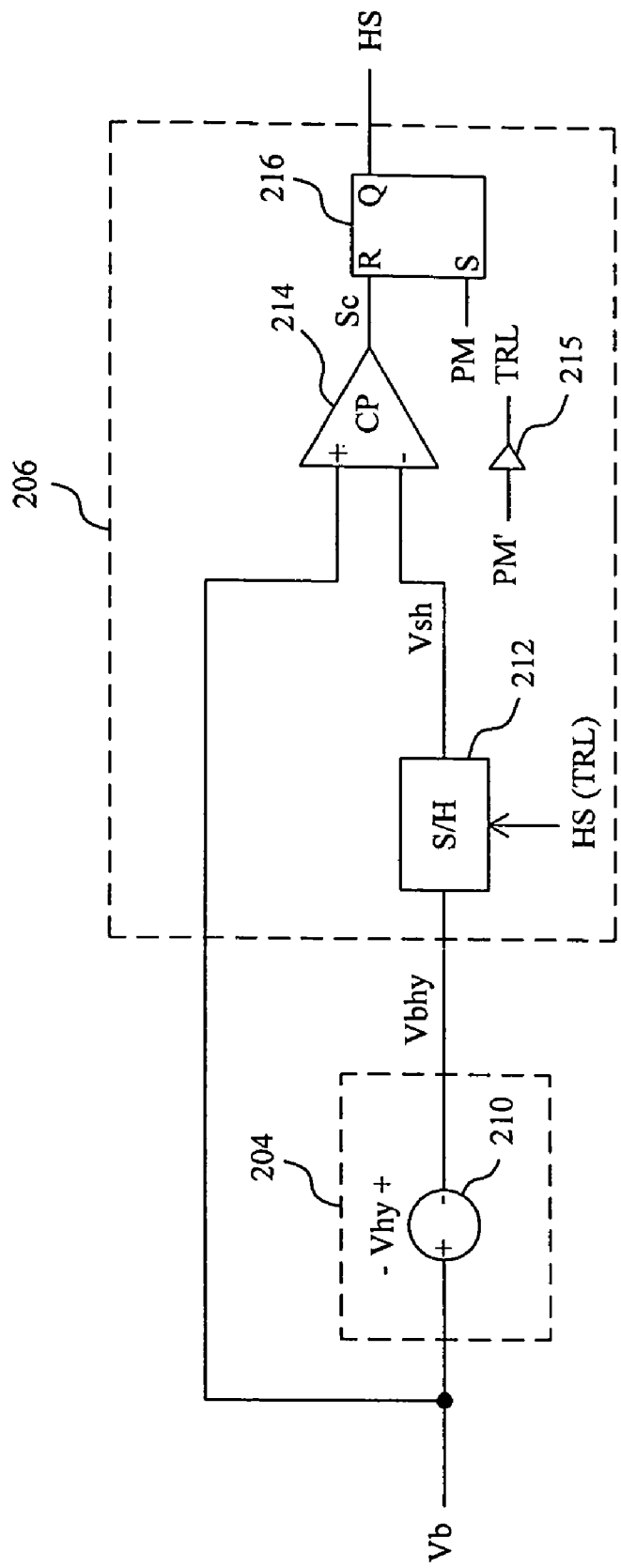
FIG. 4 shows a control circuit by modifying the control circuit of FIG. 3.

FIG. 3 shows an embodiment of the present invention, which is a control circuit 200 for a PWM system and comprises three sub-circuits 202, 204 and 206. The sub-circuit 202 includes an error amplifier 208 having a gain Ar and connected with a reference voltage Vref and the output voltage Vout of the PWM system, by detecting the output voltage Vout of the PWM system, to produce a detection signal Vb varying with the output voltage Vout. The sub-circuit 204 includes a voltage source 210 to supply a voltage Vhy as a hysteresis threshold to shift the detection signal Vb to be a shifted signal Vbhy. The sub-circuit 206 includes a sample and hold (S/H) circuit 212 in response to a high-side switching signal HS to sample the detection signal Vb to produce a signal Vsh, a comparator 214 to compare the signals Vbhy and Vsh to generate a comparison signal Sc, and an SR flip-flop 216 having its set input S and reset input R connected with the signal Sc and a signal PM, respectively, so as to produce the high-side switching signal HS for the PWM system to generate the output voltage Vout. In the sub-circuit 206, the signal PM is derived from an error amplifier by comparing the output voltage Vout of the PWM system with the reference signal Vref, as a typical PWM system does. In other embodiments, the voltage source 210 may be alternatively connected to the inverting input of the comparator 214, as shown in FIG. 4, with inverse polarity.

Figure 5A:
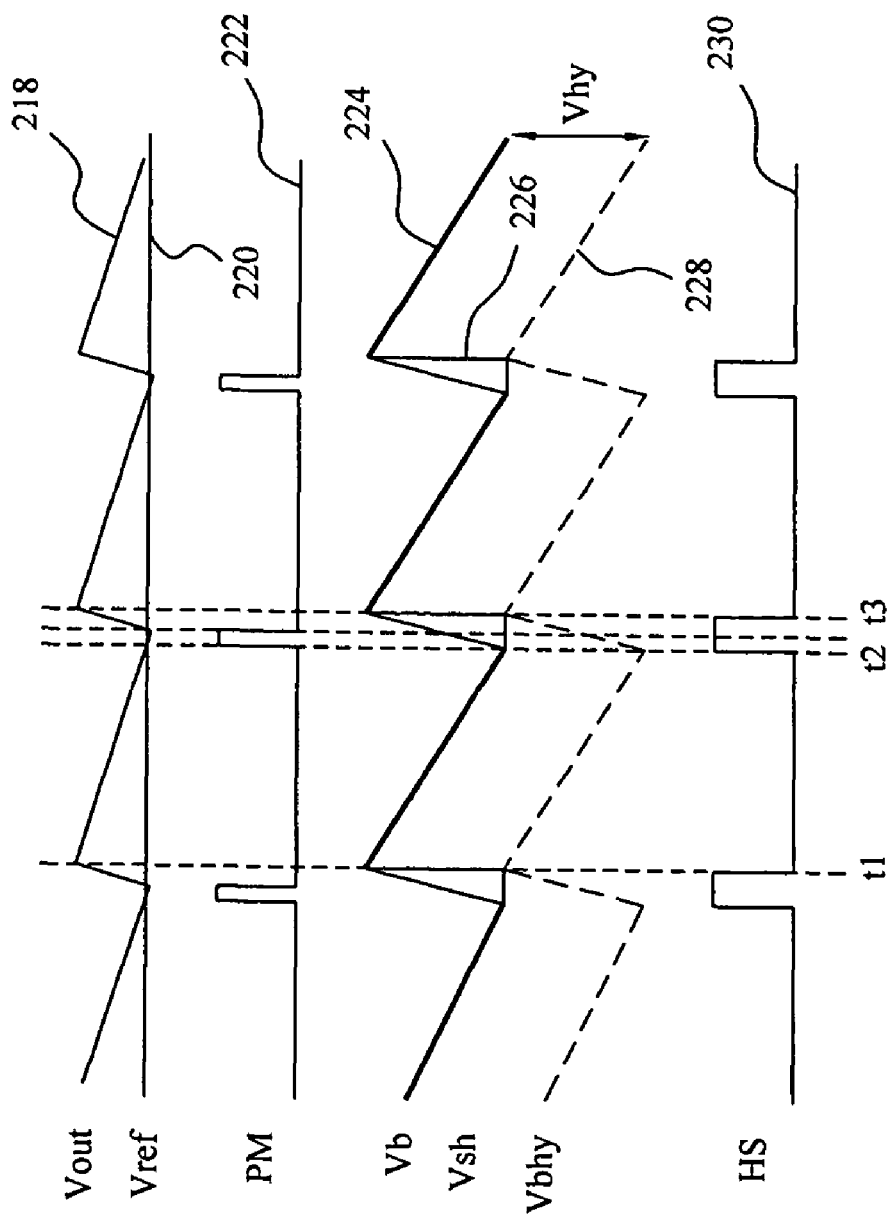
FIG. 5 is a waveform diagram to show various signals in the control circuit of FIG. 3.
Figure 5B:
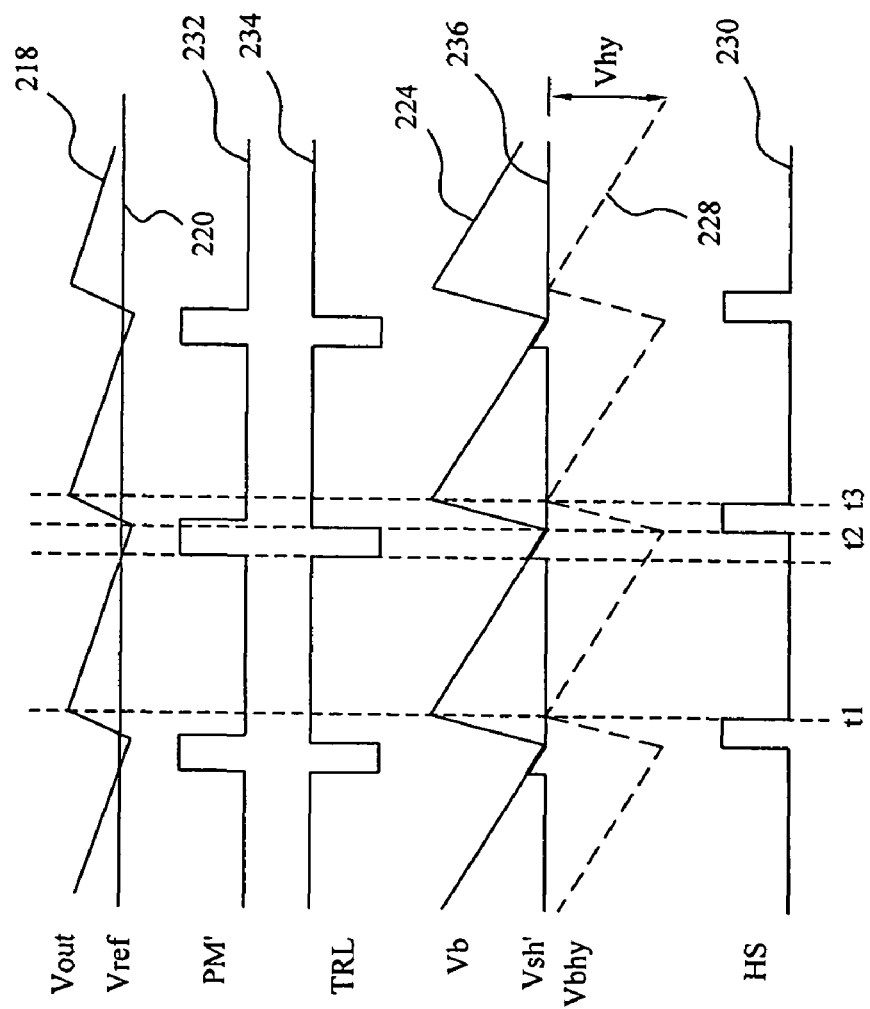

FIG. 5A is a waveform diagram to show various signals in the control circuit 200 of FIG. 3, in which waveform 218 represents the output voltage Vout, waveform 220 represents the reference voltage Vref, waveform 222 represents the signal PM, waveform 224 represents the detection signal Vb, waveform 226 represents the signal Vsh, waveform 228 represents the shifted signal Vbhy, and waveform 230 represents the high-side switching signal HS. In the control circuit 200, the difference between the output voltage Vout and reference voltage Vref is amplified by the error amplifier 208 by the gain factor Ar to produce the detection signal Vb as shown by the waveform 224. In the off period of the high-side switching signal HS, for example from time t1 to time t2 shown in FIG. 5, the sample and hold circuit 212 continuously samples the signal Vb, and thus the signal Vsh produced by the sample and hold circuit 212 will trace the signal Vb as shown by the waveform 226. Once the output voltage Vout decreases to be lower than the reference voltage Vref at time t2, the signal PM is triggered to transit from low level to high level, thereby setting the SR flip-flop 216 and having the high-side switching signal HS to be high level accordingly. Then, the sample and hold circuit 212 holds the valley of the detection signal Vb as the signal Vsh and the waveform 226 of the signal Vsh is flat, until the high-side switching signal HS terminates its on period and transits back to low level at time t3. During the high-side switching signal HS at high level, the output voltage Vout increases, and hence the signals Vb and Vbhy increase as well, as shown by the waveforms 224 and 228. Once the shifted signal Vbhy reaches the signal Vsh, the comparator 214 resets the SR flip-flop 216 by the comparison signal Sc, causing the high-side switching signal HS to transit back to low level. In this embodiment, the signal Vb is sampled by the sample and hold circuit 212 under the control of the high-side switching signal HS, while in other embodiments, the signal Vb may be sampled under the control of other signals, such as a short pulse signal TRL prior to the on period of the high-side switching signal HS. In this case, as shown in FIG. 3, the set input S of the SR flip-flop 215 is connected with the signal TRL, which is produced by a pulse generator 215 triggered by a signal PM' derived from a comparison of the output voltage Vout and reference voltage Vref. Referring to FIG. 5B, as the output voltage Vout falls down to cross the reference voltage Vref, the waveform 232 of the signal PM' transits to high level, and its rising edge triggers the pulse generator 215 to produce the short pulse as indicated by the waveform 234. When the signal TRL transits from low to high, the high-side switching signal HS is set to be high as indicated by the waveform 230 at time T2. Once the output voltage Vout crossing over the reference voltage Vref, the signal PM' transits back to low level. During the low state of the signal TRL, the detection signal Vb is sampled by the sample and hold circuit 212, and during the high state of the signal TRL, the sample and hold circuit 212 holds the valley of the detection signal Vb. Therefore, the output of the sample and hold circuit 212 has the waveform 236. However, the switching conditions will remain the same as in the above embodiment.

With the control circuit 200, the ripple control is set by the voltage Vhy supplied by the voltage source 210 and the output ripple is $$Vout\_ripple = Vhy/Ar. \qquad [\text{EQ-1}]$$

Therefore, the higher the voltage Vhy is, the greater the output ripple Vout_ripple is, and vice versa. Since the output ripple Vout_ripple depends on the voltage Vhy and gain factor Ar, as indicated by the equation EQ-1, the dc level of the output voltage Vout itself will not influence the output ripple Vout_ripple. Furthermore, the control circuit 200 determines the output ripple Vout_ripple, but not the ripple boundaries, and therefore the dc level of the output voltage Vout will not influence the operations of the control circuit 200. Since the signals Vsh and Vbhy both are produced based on the signal Vb, the amplifier offset could be omitted. The output ripple is enlarged by the amplifier 208, the comparator offset could be omitted as well.

Figure 6:
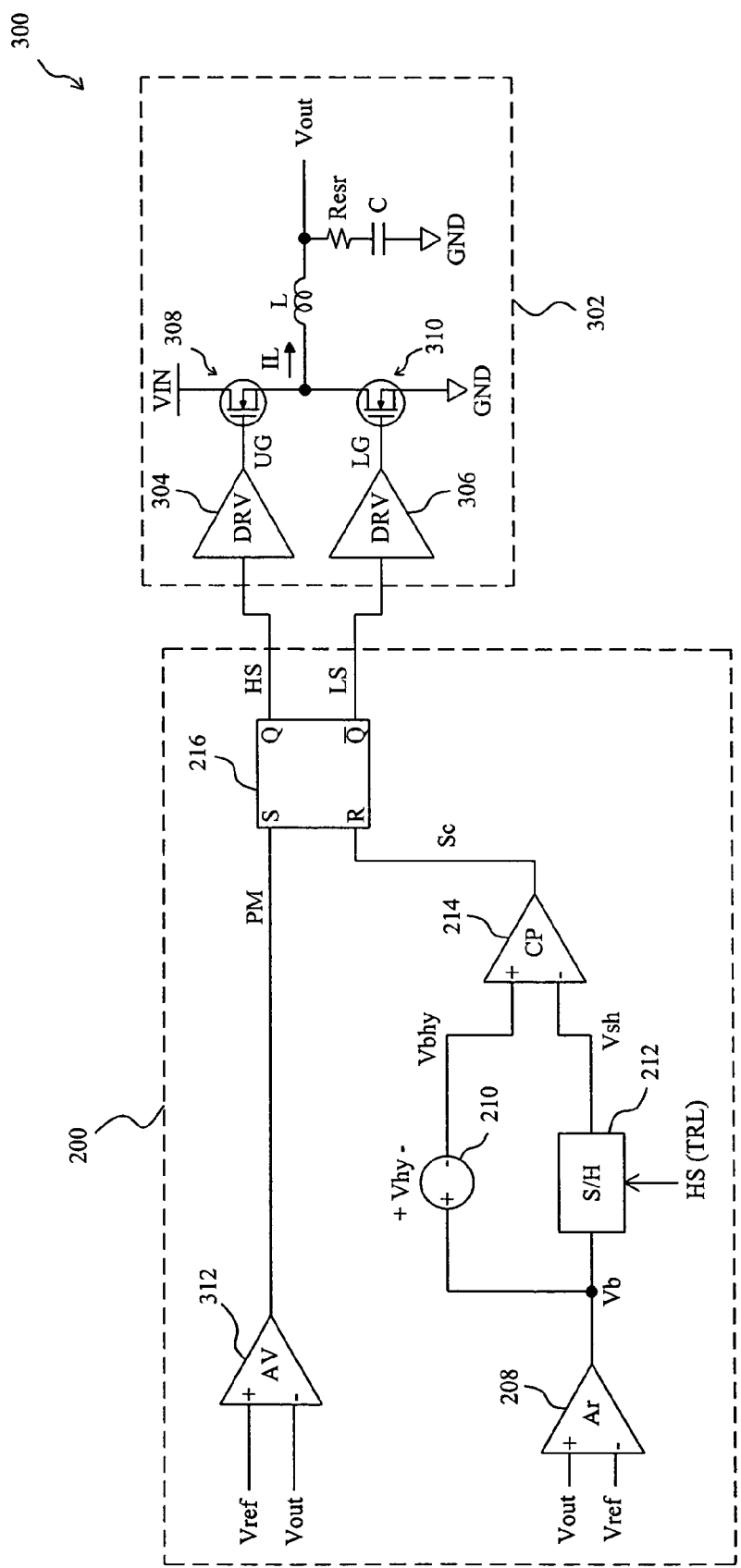
FIG. 6 shows a PWM system having a combination of the control circuit of FIG. 3 and a conventional hysteresis mode.

FIG. 6 shows an embodiment of the present invention combined with a conventional hysteresis mode, in which a PWM system 300 comprises a switching circuit 302 and a control circuit 200. The switching circuit 302 includes two drivers 304 and 306 in response to the high-side and low-side switching signals HS and LS to switch a high-side transistor 308 and a low-side transistor 310 that are serially connected between an input voltage VIN and ground GND, so as to produce an inductor current IL to charge a capacitor C to thereby produce an output voltage Vout. In addition to the error amplifier 208, voltage source 210, sample and hold circuit 212, comparator 214 and SR flip-flop 216 that are shown in FIG. 3, the control circuit 200 hereof further comprises a comparator 312 to compare the output voltage Vout with the reference voltage Vref to produce the signal PM.

Figure 7:
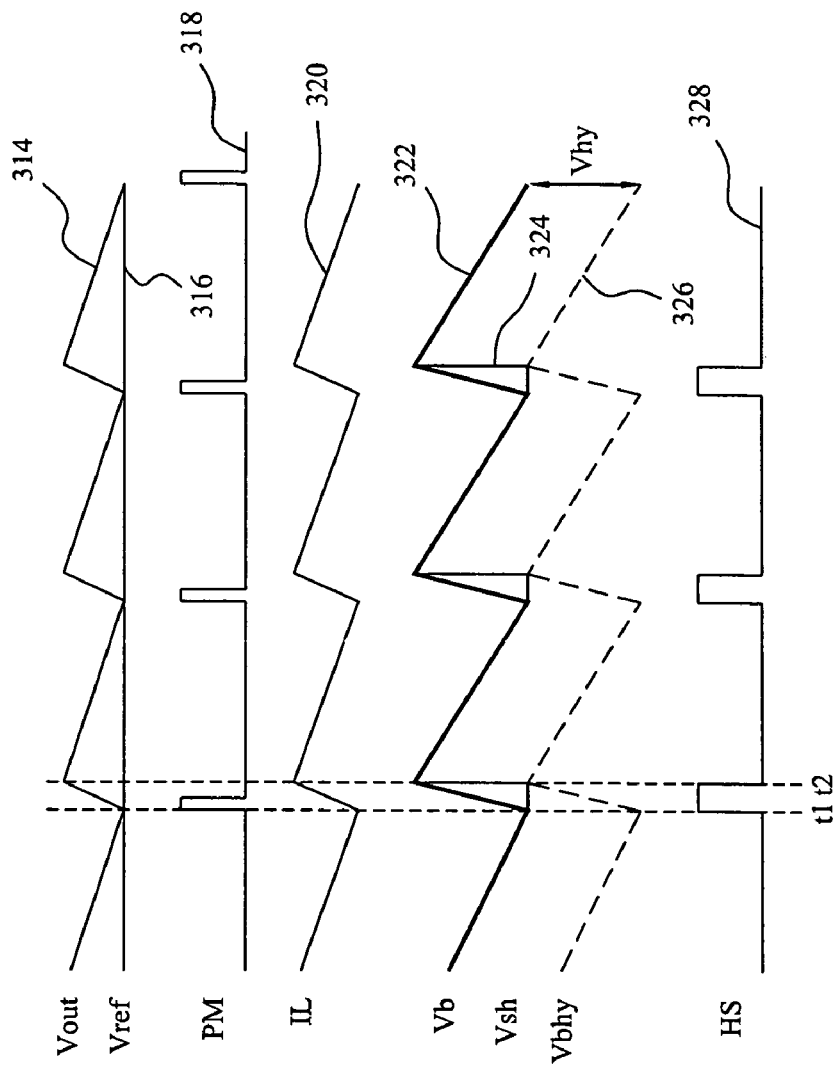
FIG. 7 is a waveform diagram to show various signals in the PWM system of FIG. 6.

FIG. 7 is a waveform diagram to show various signals in the PWM system 300 of FIG. 6, in which waveform 314 represents the output voltage Vout, waveform 316 represents the reference voltage Vref, waveform 318 represents the signal PM, waveform 320 represents the inductor current IL, waveform 322 represents the detection signal Vb, waveform 324 represents the sampled signal Vsh, waveform 326 represents the shifted signal Vbhy, and waveform 328 represents the high-side switching signal HS. As shown in FIG. 6 and FIG. 7, once the output voltage Vout decreases to reach the reference voltage Vref, for example at time t1, the signal PM produced by the comparator 312 transits from low level to high level as shown by the waveform 318, and thus triggers the SR flip-flop 216 to produce the high-side switching signal HS to become high level to turn on the high-side transistor 308 and the low-side switching signal LS to become low level to turn off the low-side transistor 310, causing the output voltage Vout and hence the signals Vb and Vbhy to increase. During the on period of the high-side switching signal HS, for example from time t1 to time t2, the sample and hold circuit 212 holds the valley of the signal Vsh until the shifted signal Vbhy reaches the signal Vsh at time t2. Thereafter, the comparator 214 resets the SR flip-flop 216 by the signal Sc, causing the high-side switching signal HS to transit back to low level to turn off the high-side transistor 308 and the low-side switching signal LS to transit to high level to turn on the low-side transistor 310. Accordingly, the output voltage Vout decreases until it touches down the reference voltage Vref again. It is shown by the waveforms of FIG. 7 that the control circuit 200 of FIG. 6 may clamp the output ripple Vout ripple of the PWM system 300 within a specific range as the conventional hysteresis control does.

Figure 8:
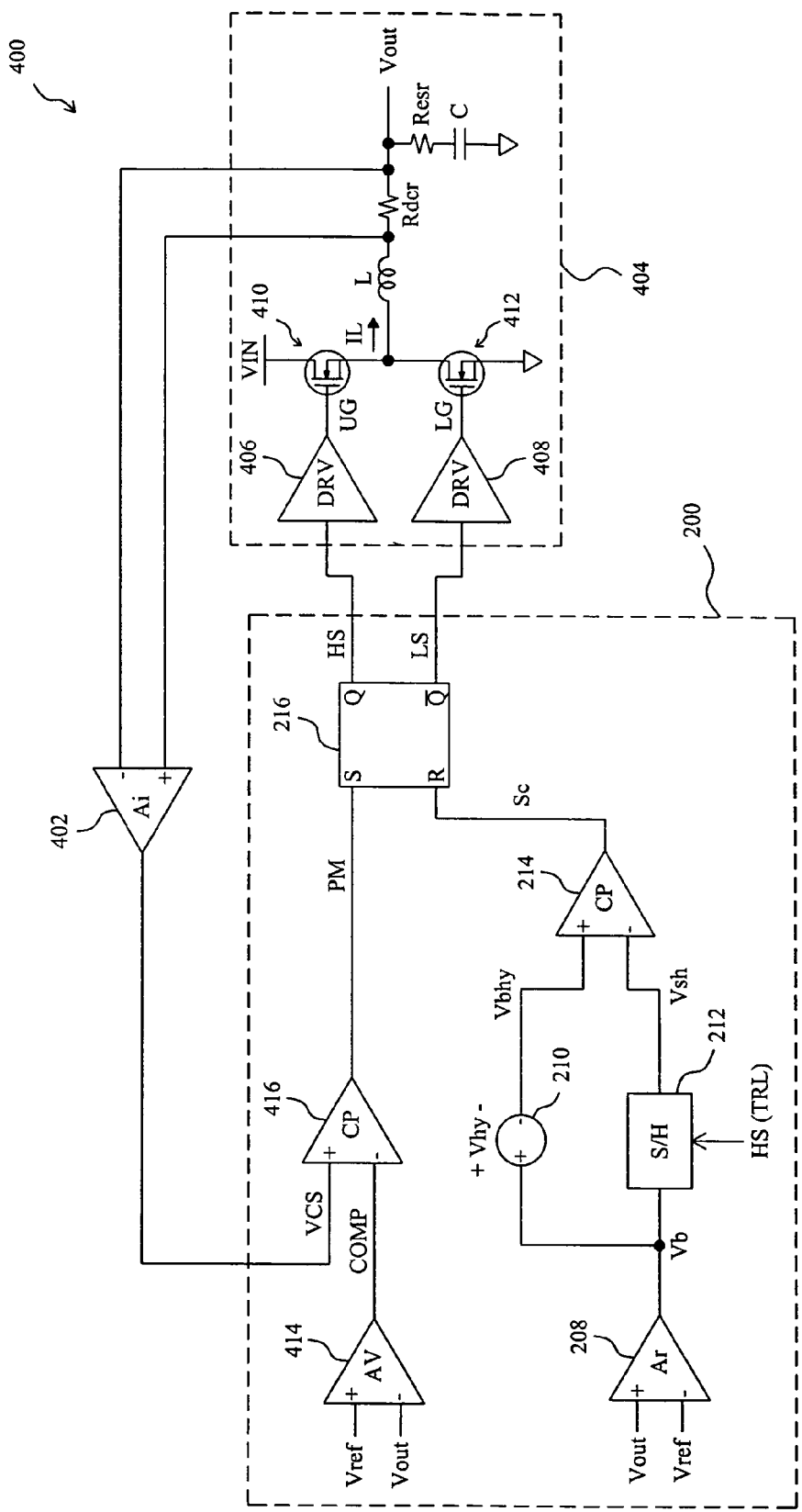
FIG. 8 shows a PWM system having a combination of the control-circuit of FIG. 3 and a peak current mode.

FIG. 8 shows an embodiment of the present invention combined with a peak current mode, in which a PWM system 400 comprises a control circuit 200, a switching circuit 404 and a sense circuit 402. The switching circuit 404 includes two drivers 406 and 408 in response to the high-side and low-side switching signals HS and LS to switch a high-side transistor 410 and a low-side transistor 412 that are serially connected between an input voltage VIN and ground GND, so as to produce an inductor current IL to charge a capacitor C to thereby produce an output voltage Vout. In addition to the error amplifier 208, voltage source 210, sample and hold circuit 212, comparator 214 and SR flip-flop 216 that are shown in FIG. 3, the control circuit 200 hereof further includes an error amplifier 414 to compare the output voltage Vout with the reference voltage Vref to produce an error signal COMP, and a comparator 416 to compare the error signal COMP with a current sense signal VCS produced by sensing the inductor current IL by the sense circuit 402 to generate the signal PM. When the inductor current IL increases, the dc level of the output voltage Vout will decrease and result in a voltage droop. However, the output ripple Vout_ripple will be still kept at Vhy/Ar, as indicated by the equation EQ-1.

Figure 9:
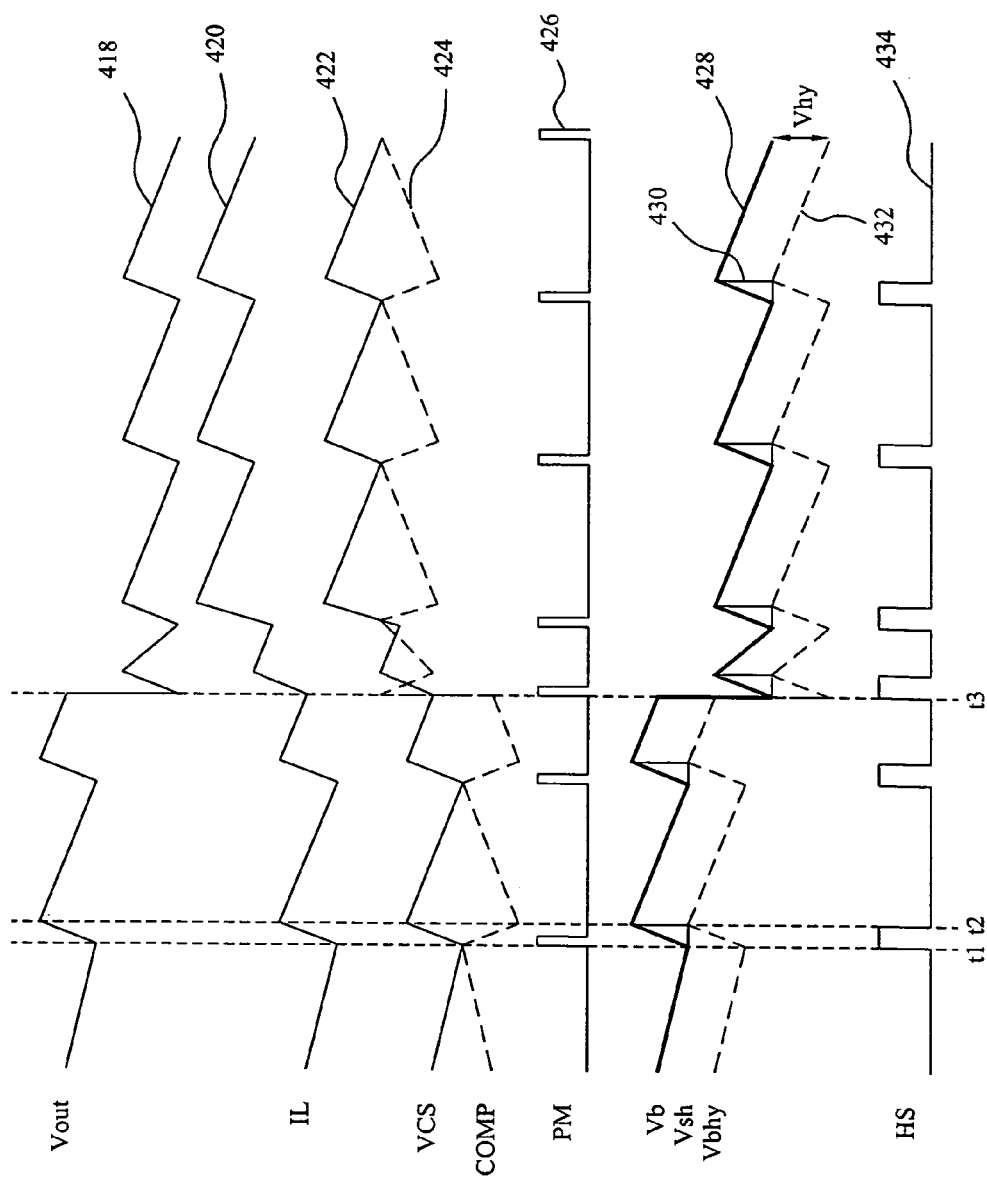
FIG. 9 is a waveform diagram to show various signals in the PWM system of FIG. 8.

FIG. 9 is a waveform diagram to show various signals in the PWM system 400 of FIG. 8, in which waveform 418 represents the output voltage Vout, waveform 420 represents the inductor current IL, waveform 422 represents the current sense signal VCS, waveform 424 represents the error signal COMP, waveform 426 represents the signal PM, waveform 428 represents the signal Vb, waveform 430 represents the sampled signal Vsh, waveform 432 represents the shifted signal Vbhy, and waveform 434 represents the high-side switching signal HS. As shown in FIG. 8 and FIG. 9, upon the error signal COMP reaching the current sense signal VCS, for example at time t1, the signal PM produced by the comparator 416 becomes high level to trigger the SR flip-flop 216 to generate the high-side switching signal HS of high level to turn on the high-side transistor 410 and the low-side switching signal LS of low level to turn off the low-side transistor 412. During the on period of the high-side switching signal HS from time t1 to time t2, the signal Vsh is held constant, until the shifted signal Vbhy reaches the signal Vsh at time t2 the comparator 214 resets the SR flip-flop 216 by the signal Sc to transit the high-side switching signal HS from high level to low level to turn off the high-side transistor 410 and the low-side switching signal LS to from low level high level to turn on the low-side transistor 412, and therefore the output voltage Vout decreases and hence the comparison signal COMP increases until the comparison signal COMP reaches the current sense signal VCS again. At time t3, the PWM system 400 suffers a load transient, causing the output voltage Vout to drop down instantly and the inductor current IL to increase. From the equation EQ-1, the output ripple Vout_ripple depends on the voltage Vhy supplied by the voltage source 210, also called hysteresis threshold, it is therefore maintained fixed even the load transient occurs, which is the case that a low-gain current mode can never achieve.

As illustrated, the output ripple control of the present invention is able to be combined into any other main loop topologies, such as hysteresis mode and low-gain current mode.

Figure 10:
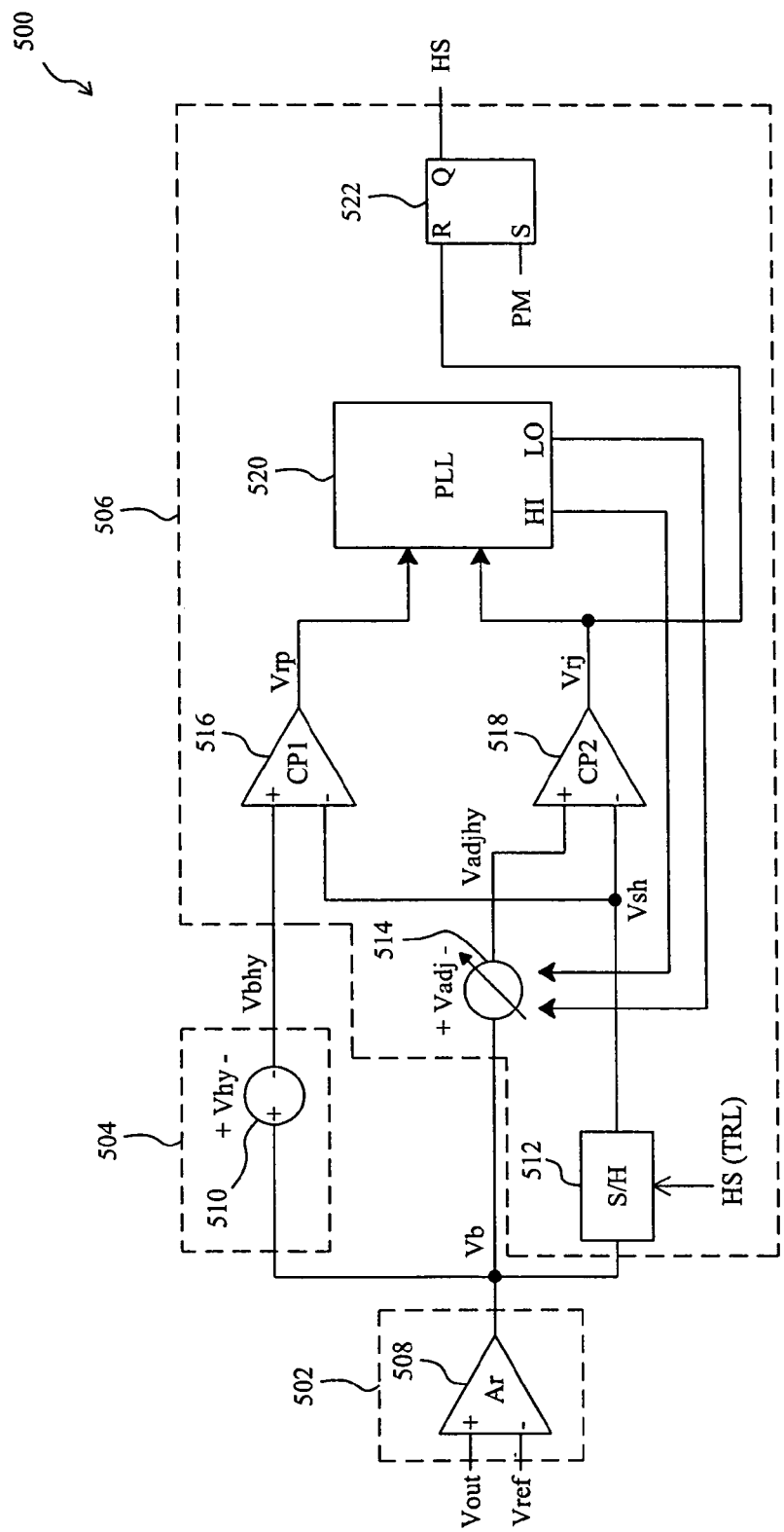
FIG. 10 shows a control circuit according to the present invention to compensate the ripple error.

Comparator delay and driver delay may affect the ripple accuracy, and thus an embodiment of the present invention to compensate the ripple error is provided in FIG. 10, in which a control circuit 500 comprises three sub-circuits 502, 504 and 506. The sub-circuit 502 includes an error amplifier 508 to detect the output voltage Vout and to generate a detection signal Vb. The sub-circuit 504 includes a voltage source 510 to supply a voltage Vhy as a first hysteresis threshold for shifting the detection signal Vb to be a signal Vbhy. In the sub-circuit 506, a sample and hold circuit 512 samples the detection signal Vb under the control of the high-side switching signal HS to produce a signal Vsh, a variable voltage source 514 supplies a variable voltage Vadj as a second hysteresis threshold for shifting the detection signal Vb to be a second shifted signal Vadjhy, a first comparator 516 compares the signals Vbhy and Vsh to produce a first comparison signal Vrp, a second comparator 518 compares the signals Vadjhy and Vsh to produce a second comparison signal Vrj, a phase-lock loop (PLL) 520 produces two signals HI and LO based on the comparison signals Vrp and Vrj to adjust the variable voltage Vadj, and an SR flip-flop 522 has its set input S and reset input R connected with a signal PM and the signal Vrj to generate the high-side switching signal HS. In this embodiment, the PLL 520 is used to control the ripple more precisely. Specifically, the control circuit 500 sets two hysteresis thresholds Vhy and Vadj and provides two comparators 516 and 518 in association therewith, respectively, in which the first hysteresis threshold Vhy is fixed for external setting and the second hysteresis threshold Vadj is variable for delay effect adjustment. The first shifted signal Vbhy is always less than the detection signal Vb with the first hysteresis threshold Vhy, and the second comparison signal Vrj is sent to reset the SR flip-flop 522 and determines the adjustment of the voltage Vadj. The first comparison signal Vrp is produced from the first shifted signal Vbhy; it is therefore used as the basis signal. If the first comparison signal Vrp is maintained substantially at low level in the on period of the high-side switching signal HS, it indicates that the voltage Vadj is not great enough and accordingly, the high-side switching signal HS has too short on period for the first shifted signal Vbhy to be comparable with the signal Vsh, thus the PLL 520 is triggered to increase the voltage Vadj, and vice versa.

Figure 11:
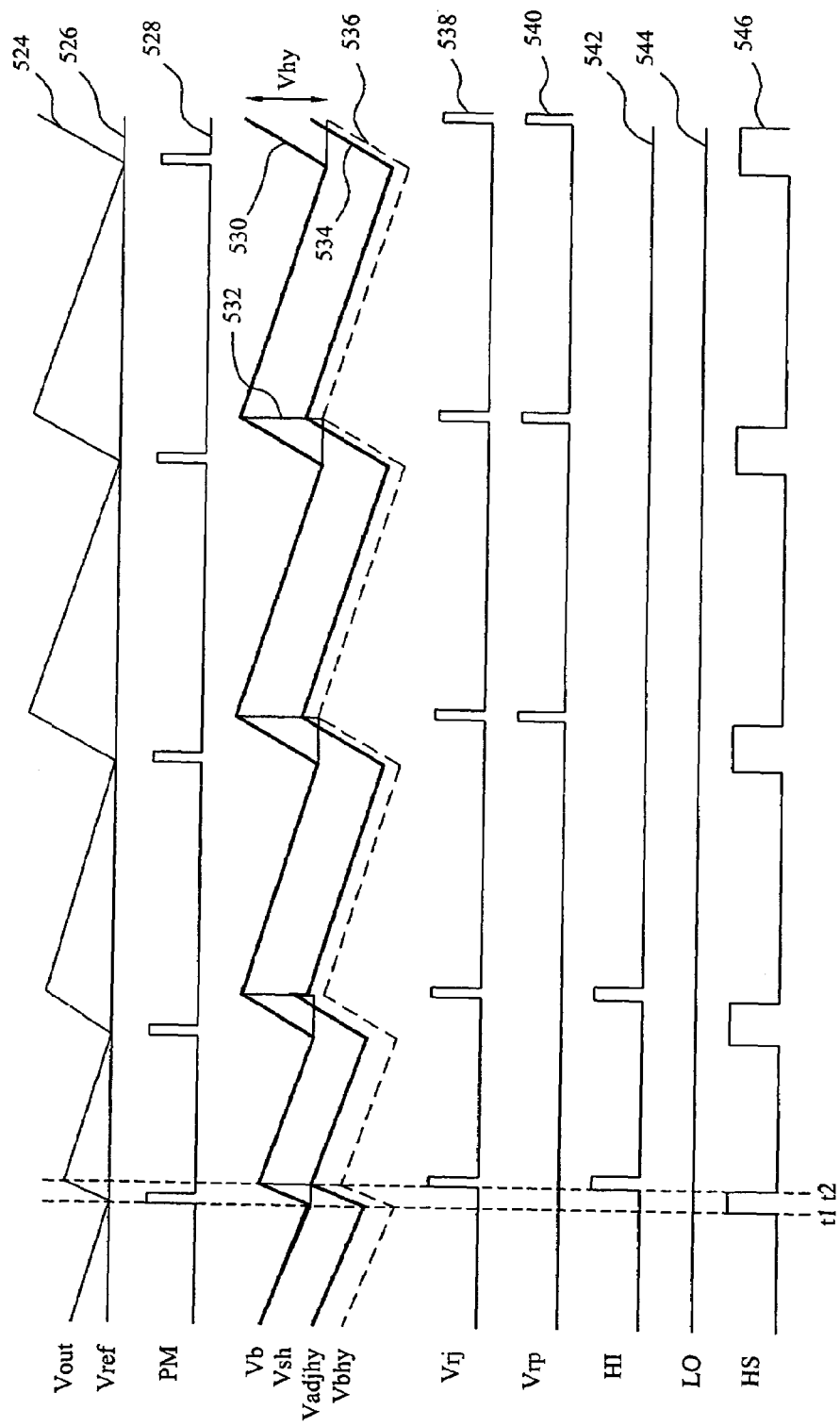
FIG. 11 is a waveform diagram to show various signals in the control circuit of FIG. 10.

FIG. 11 is a waveform diagram to show various signals in the control circuit 500 of FIG. 10, in which waveform 524 represents the output voltage Vout, waveform 526 represents the reference voltage Vref, waveform 528 represents the signal PM, waveform 530 represents the detection signal Vb, waveform 532 represents the sampled signal Vsh, waveform 534 represents the second shifted signal Vadjhy, waveform 536 represents the first shifted signal Vbhy, waveform 538 represents the second comparison signal Vrj, waveform 540 represents the first comparison signal Vrp, waveform 542 represents the upward signal HI, waveform 544 represents the downward signal LO, and waveform 546 represents the high-side switching signal HS. At time t1, the output voltage Vout reaches the reference voltage Vref, therefore the signal PM transits from low level to high level to set the SR flip-flop 522, causing the high-side switching signal HS to be high level and as a result, the output voltage Vout increases. During the on period of the high-side switching signal HS, i.e., from time t1 to time t2, the detection signal Vb and the two shifted signals Vadjhy and Vbhy all raise up in follow to the increasing output voltage Vout, and the signal Vsh is held at a constant. At time t2, the second shifted signal Vadjhy reaches the signal Vsh and the second comparison signal Vrj produced by the comparator 518 becomes high level so as to reset the SR flip-flop 522 to have the high-side switching signal HS to be low level. However, if the first shifted signal Vbhy has not yet reached the signal Vsh at this time, which indicates that the voltage Vadj is lower than the voltage Vhy, the first comparison signal Vrp produced by the comparator 516 will be low level, and based on the high level of the second comparison signal Vrj and the low level of the signal first comparison Vrp, the PLL 520 signals the voltage source 514 by the upward signal HI to increase the voltage Vadj. This adjustment will be kept on going before the voltage Vadj equal to the voltage Vhy. On the contrary, if the signal Vbhy reaches the signal Vsh earlier than the signal Vadjhy, i.e., the voltage Vadj is greater than the voltage Vhy, the PLL 520 will signal the voltage source 514 by the downward signal LO to decrease the voltage Vadj. With such adjustment of the voltage Vadj, it is able to obtain the precise output ripple. The waveform diagram of FIG. 11 shows the case that the ripple of the output voltage Vout is small in the initial state and gradually adjusted by the PLL 520 to the precise one. Since the second comparison signal Vrj is used to reset the SR flip-flop 522, the second shifted signal Vadjhy crossing with the signal Vsh determines the pulse width of the high-side switching signal HS. If the first shifted signal Vbhy cannot cross with the signal Vsh, it indicates that the Vadj ripple is smaller than the Vhy ripple. Then, the output Vrp of the first comparator 516 will be kept at low level, and the output Vrj of the second comparator 518 will be triggered to high level. The signals Vrp and Vrj may be thus provided for the PLL 520 to adjust the voltage Vadj. During this process, the on period of the high-side switching signal HS is enlarged by adjusting the voltage Vadj to be greater each time the second shifted signal Vadjhy reaches the signal Vsh earlier than the first shifted signal Vbhy, and in this case the upward signal HI will be triggered to high level for adjusting the voltage Vadj.

As illustrated, the output ripple control of the present invention offers more flexible and easier implementation for PWM systems.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An output ripple control circuit for a PWM system including a switching circuit to convert an input voltage to an output voltage, said output ripple control circuit comprising:
    a first sub-circuit for detecting said output voltage to generate a first signal;
    a second sub-circuit having a hysteresis threshold for shifting said first signal to be a second signal; and
    a third sub-circuit in response to said first and second signals to produce a third signal for driving said switching circuit, wherein said third sub-circuit includes:
        a sample and hold circuit for sampling said first signal to generate a fourth signal;
        a comparator for comparing said second and fourth signals to generate a fifth signal; and
        a flip-flop in response to said fifth signal and a sixth signal for producing said third signal.

2. The output ripple control circuit of claim 1, wherein said sample and hold circuit samples said first signal based on said third signal.

3. An output ripple control method for a PWM system including a switching circuit to convert an input voltage to an output voltage, said output ripple control method comprising the steps of:
    generating a first signal varying with said output voltage;
    generating a second signal by shifting said first signal with a hysteresis threshold; and
    driving said switching circuit in response to said first and second signals; wherein said step of driving said switching circuit in response to said first and second signals comprises the steps of:
        sampling said first signal for generating a third signal; and
        comparing said second and third signals for generating a fourth signal to drive said switching circuit.

* * * * *